Sept. 23, 1924.
H. OTTO
1,509,479
ROPEWAY BUCKET CONVEYER SYSTEM
Filed April 10, 1922
7 Sheets-Sheet 2
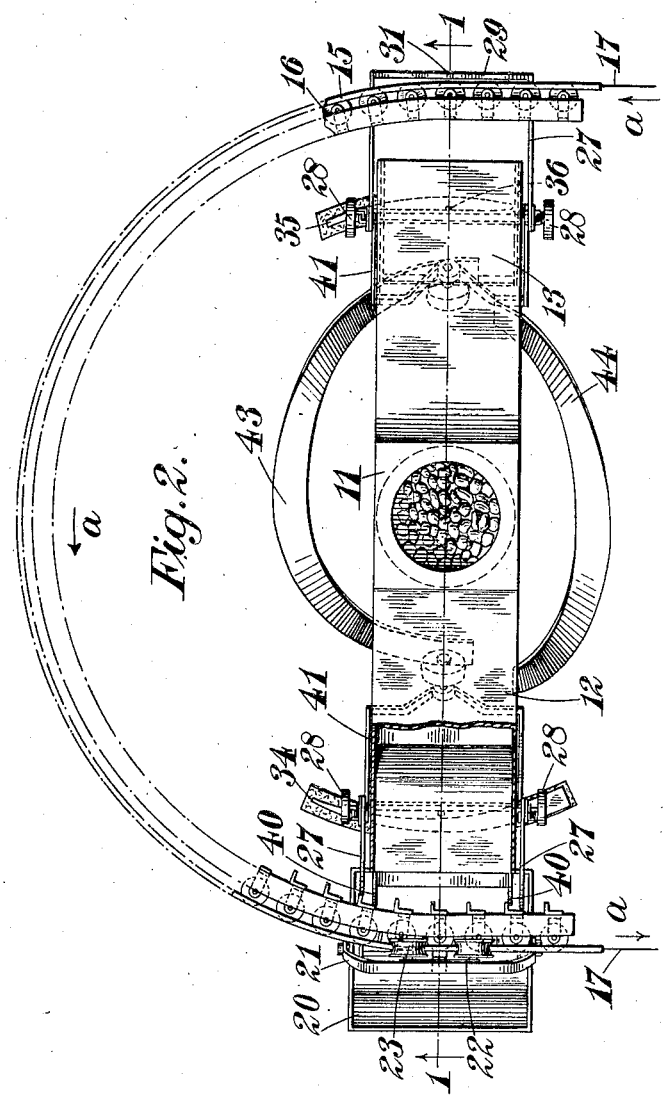

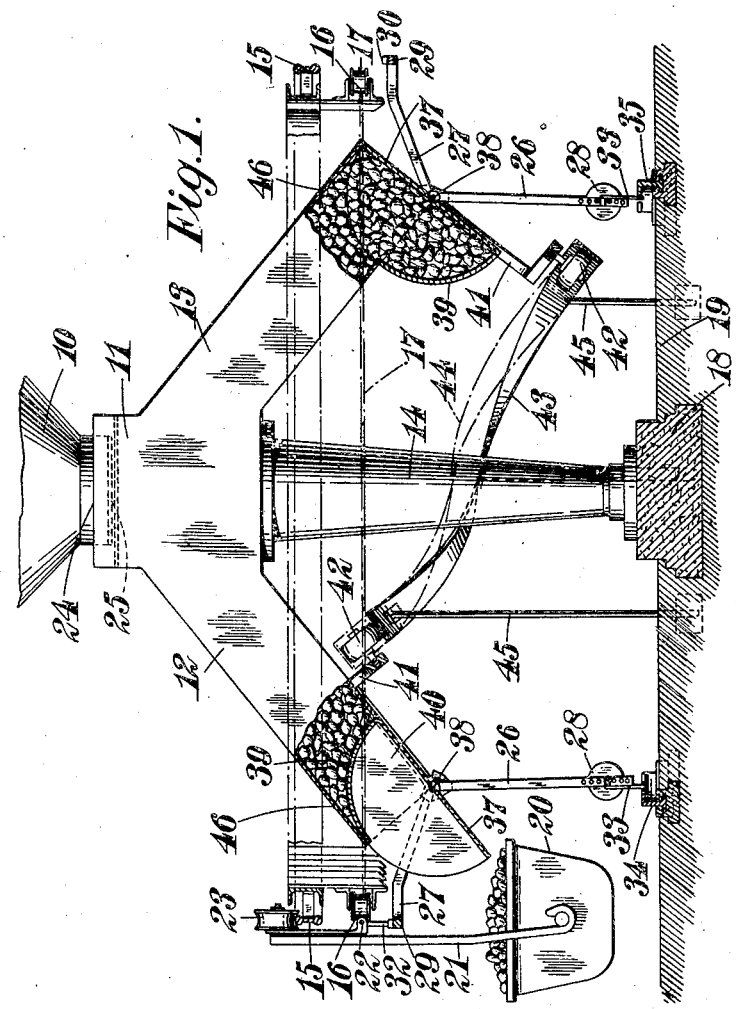

Sept. 23, 1924.
H. OTTO
ROPEWAY BUCKET CONVEYER SYSTEM
Filed April 10, 1922 7 Sheets-Sheet 3
1,509,479
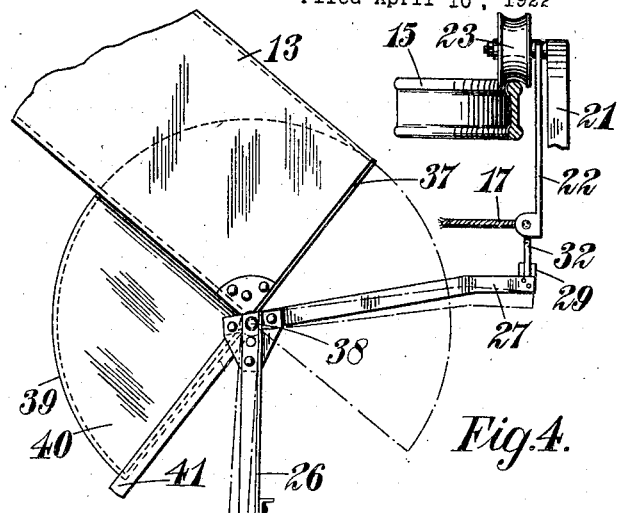
Fig.4.
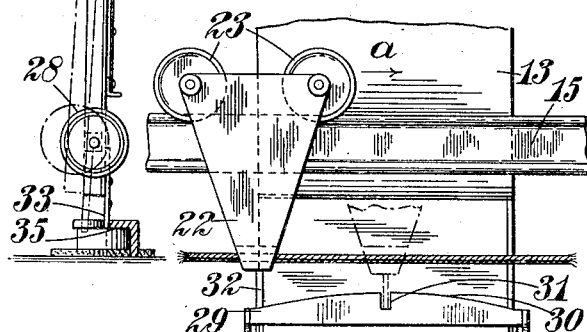
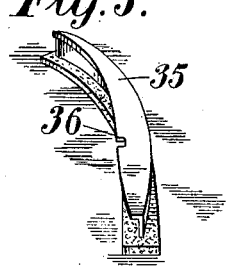
Fig.5.
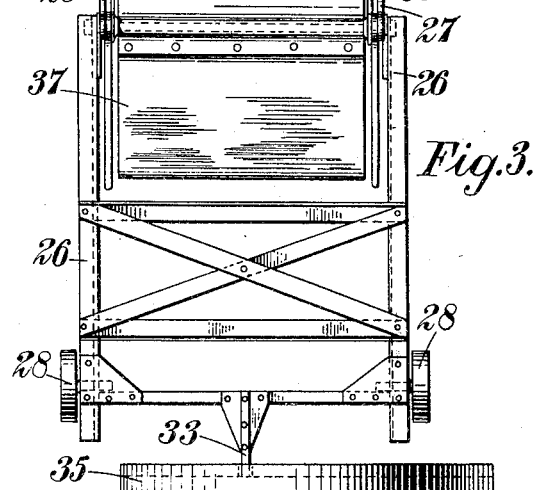
Fig.3.
Inventor:
Henry Otto,
By Watson, Coit, Morse & Grindle,
Attorneys.

Sept. 23, 1924.
H. OTTO
1,509,479
ROPEWAY BUCKET CONVEYER SYSTEM
Filed April 10, 1922   7 Sheets-Sheet 4
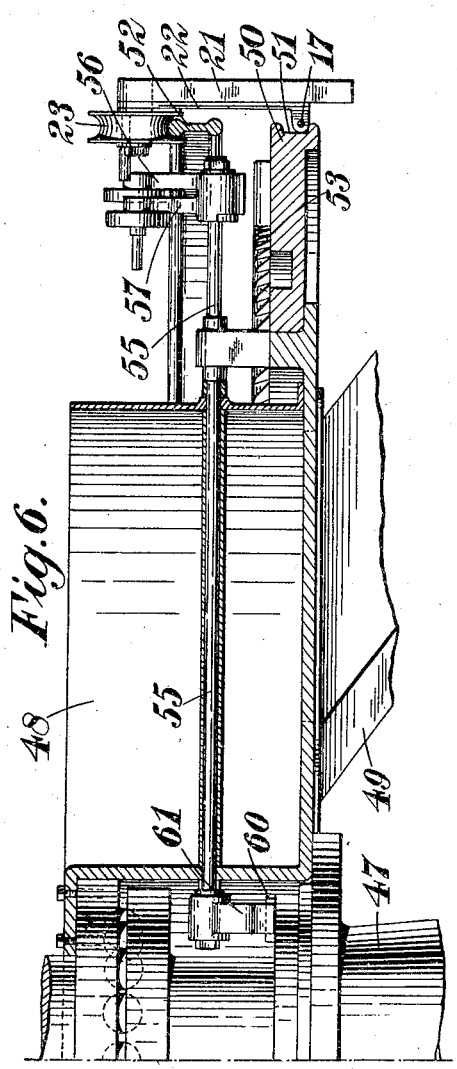
Inventor
Henry Otto,
By Watson, Coit, Morse & Grindle,
Attorneys.

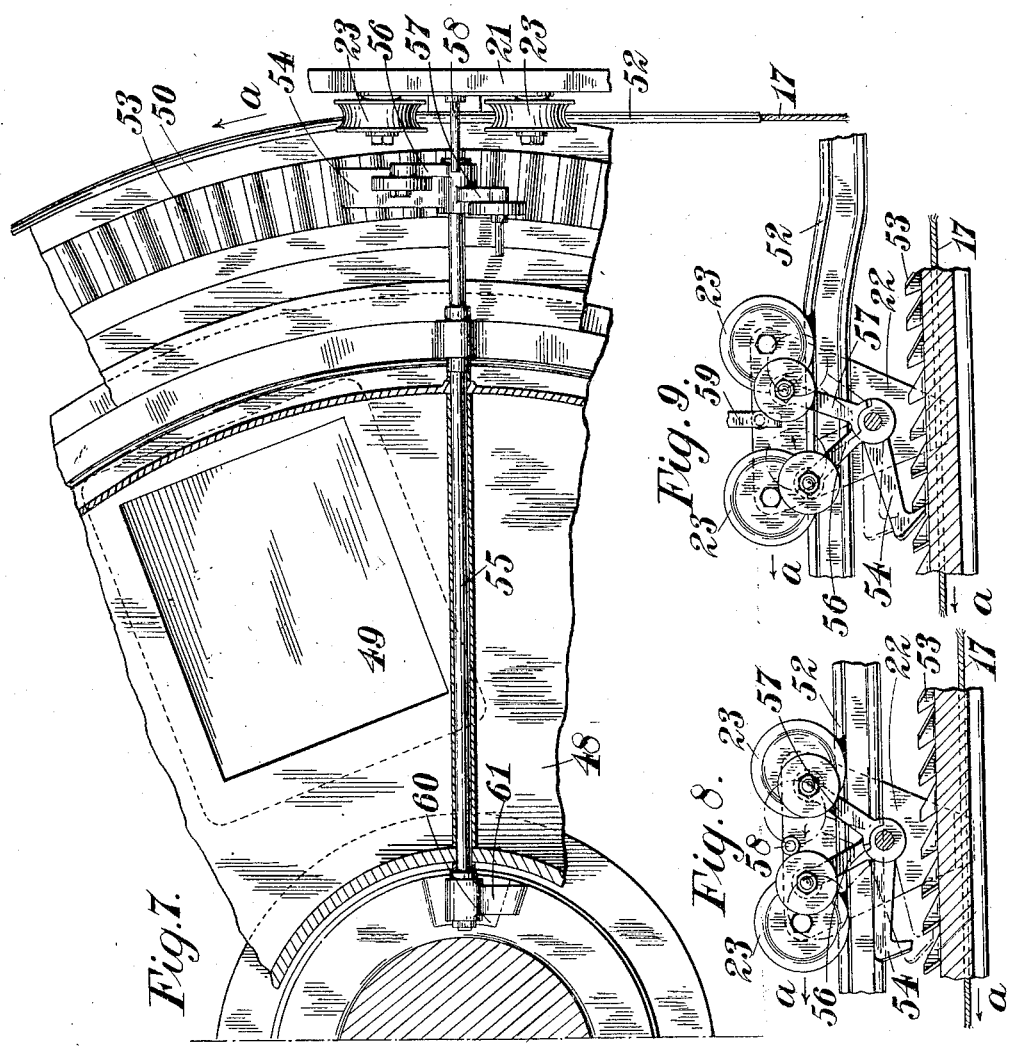

Sept. 23, 1924.

H. OTTO 1,509,479

ROPEWAY BUCKET CONVEYER SYSTEM

Filed April 10, 1922    7 Sheets-Sheet 6

Inventor:
Henry Otto,
By Watson, Coit, Morse & Grindle,
Attorneys.

Sept. 23, 1924.  
H. OTTO  
ROPEWAY BUCKET CONVEYER SYSTEM  
Filed April 10, 1922    7 Sheets-Sheet 7

1,509,479

INVENTOR.  
Henry Otto.  
By Watson, Coit, Morse & Grindle,  
ATTY's

Patented Sept. 23, 1924.

1,509,479

UNITED STATES PATENT OFFICE.

HENRY OTTO, OF WALTHAMSTOW, LONDON, ENGLAND.

ROPEWAY BUCKET CONVEYER SYSTEM.

Application filed April 10, 1922. Serial No. 551,152.

*To all whom it may concern:*

Be it known that I, HENRY OTTO, a subject of the King of England, residing at Walthamstow, London, England, have invented certain new and useful Improvements in Ropeway Bucket Conveyer Systems, of which the following is a specification.

This invention is for improvements in or relating to ropeway bucket conveyer systems and has for one of its objects to provide a construction whereby the speed of working is increased and the cost diminished.

The invention is particularly concerned with ropeway bucket conveyer systems of the type in which an automatic bucket-charging device charges the buckets in turn while moving circularly with them, and according to the primary feature of the present invention a ropeway bucket conveyer system of this type is provided which is characterized in that the bucket-charging device returns to its initial position by moving in a single direction in a path in the form of a complete circle, to a portion only of which the path of the buckets correspond. There is thus no need to reverse the direction of travel of the charging device in order, after it has charged one bucket, to return it to position ready for charging another bucket, and this arrangement will be found to be of advantage both from the point of view of efficiency and speed of working.

Conveniently, when the bucket and the charging device are rotated together as aforesaid, they are actuated by a single driving member. Absolute synchronism in their movements is thereby readily secured, the advantage of which will be apparent. The charging device may be automatically coupled to the bucket at one point of its travel and automatically disengaged therefrom at another point.

Other features of the invention relate to certain constructions of mechanism for effecting the automatic manipulation of the charging device and will be more particularly described hereinafter.

For a more complete understanding of these and other features of the invention, there will now be described, by way of example only and with reference to the accompanying drawings, several constructional forms of appliance according to the present invention. It is to be understood, however, that the invention is not limited to the precise constructional details set forth.

In these drawings:—

Figure 1 is an elevation, partly in section on the line 1—1 of Figure 2, showing a portion of a ropeway bucket conveyer system and of an automatic bucket-charging device employed in conjunction therewith;

Figure 2 is a plan view of the parts shown in Figure 1;

Figure 3 is a front elevation of certain of the parts appearing in Figures 1 and 2, but on a scale larger than that of these figures;

Figure 4 is an end elevation corresponding to Figure 3;

Figure 5 is a perspective view of a locking rail appearing in Figures 1 and 2, but shown on a scale larger than that of these figures;

Figure 6 is a view corresponding to Figure 1 of a modified construction;

Figure 7 is a plan view of the parts shown in Figure 6;

Figure 10:
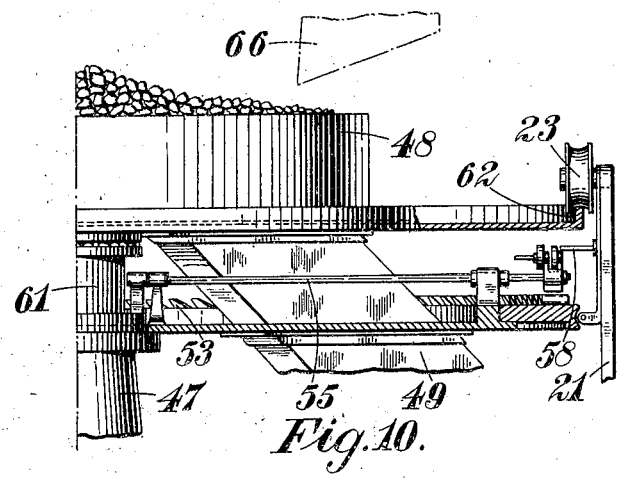
Figure 11:
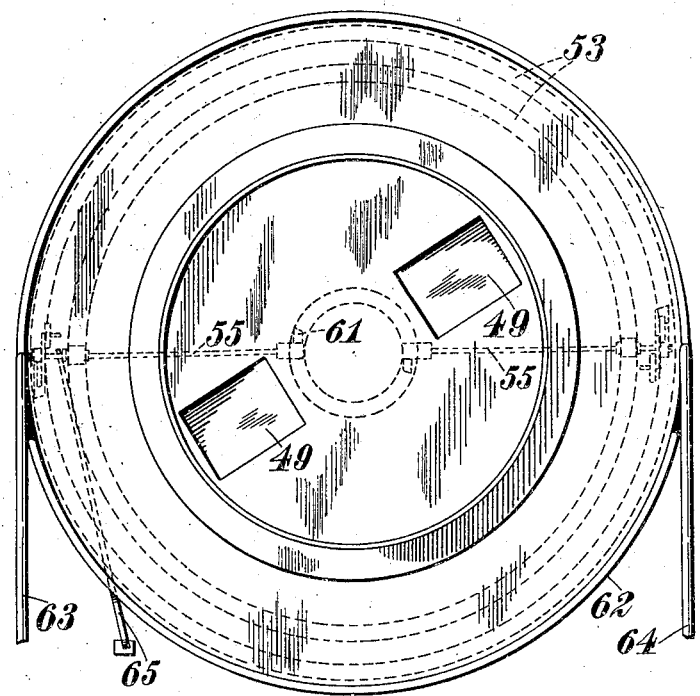

Figures 8 and 9 are corresponding side views of certain details of the mechanism illustrated in Figures 6 and 7, the mechanism being shown in Figures 8 and 9 in two different positions;

Figure 10 is a view corresponding to Figure 1 of a further modified construction, and Figure 11 is a plan view, on a scale smaller than that of Figure 10, showing certain of the parts employed in the construction shown in that figure.

Figure 12:
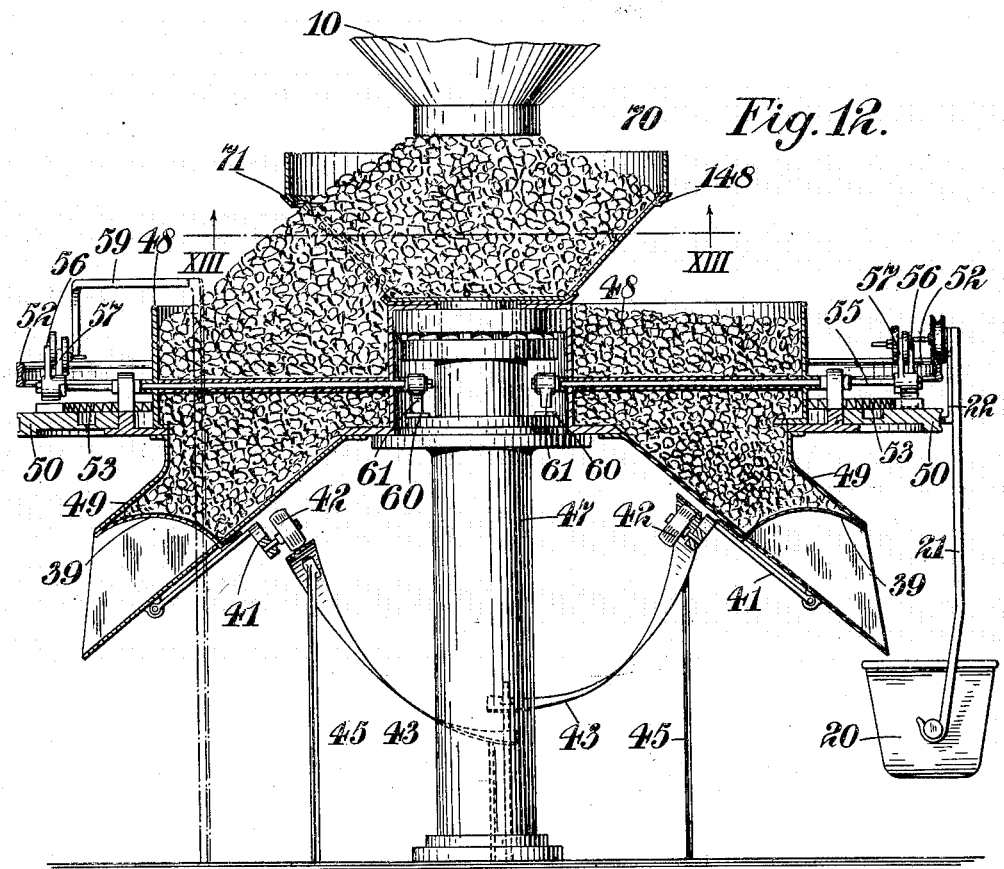
Figure 13:
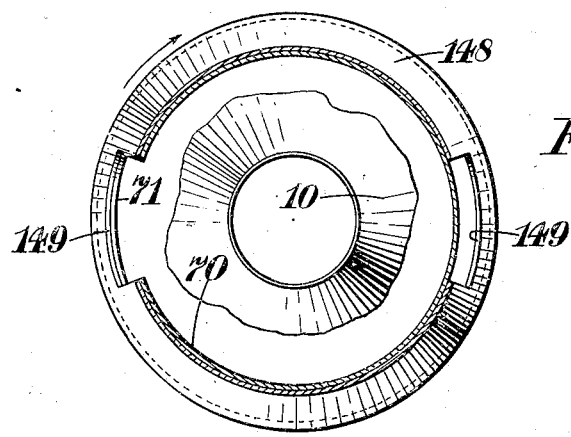

Figure 12 is a vertical elevation of a bucket charging device comprising the parts shown in Figures 6 to 9, but drawn on a smaller scale, and Figure 13 is a horizontal section, as seen from below, taken on the line XIII—XIII in Figure 12 showing a valve.

Like reference numerals indicate like parts throughout the drawings.

Referring first of all to Figures 1 to 5, a main receiver for coal or other material to be conveyed is illustrated at 10. This receiver has situated below it a hopper 11 which it supplies with material. The hopper 11 is rotatable relatively to the receiver 10 and has two chutes 12 and 13 leading from it. The hopper 11 with its chutes is arranged to rotate about a central axis through the outlet of the receiver 10 and is supported upon a pedestal 14 of any convenient construction. Arranged about the axis of the hopper 11, in the form substantially of a semi-circle is a stationary rail 15 the ends of which are arranged in operative alignment with the usual upper supporting rope of the ropeway system. Below the rail 15, and also arranged in substantially the form of a semi-circle, is a series of rollers 16 each upon a vertical pivot and each having a grooved guiding surface upon which is received the lower or driving rope 17 of the system. The receiver 10, hopper 11, and chutes 12 and 13 constitute part of the bucket-charging device of the system and they will, therefore, be arranged at some suitable terminal or intermediate point of the system. In the latter case a U-shaped bend could be formed in the path of the ropeway, whereof the outer portion of the bend is of semi-circular shape, and follows the contour of the path of the rotary members of the bucket-charging device. Furthermore, the bucket-charging device may be supported upon some suitable vehicle in order that it may be moved as a unit along the line of ropeway so as to facilitate feeding from a bunker, or for other purposes. The mounting 18 illustrated in Figure 1, therefore, may either be received in the surface of the ground at 19 or in the surface of such a vehicle as just mentioned. Obviously a suitable motor operating in conjunction with the bucket-charging device could be employed to effect transportation of the vehicle.

Referring to Figure 2, the direction of travel of the rope 17 is illustrated by the arrows $a$. A bucket is illustrated at 20. This may be of any desired construction and be coupled to the rope in any suitable manner. Conveniently the bucket is supported by its yoke 21 being secured to a carrier 22 having wheels 23 which run upon the upper rope of the system, and upon the rail 15 when they reach it. The rope 17 is continuously driven and the buckets 20 are coupled to it at any suitable intervals. Quite frequently these intervals vary within wide limits. It is, therefore, preferred to arrange that rotation of the hopper 11 with its chutes shall be intermittent. When two chutes are employed, as in the construction illustrated, the extent of rotation is half a turn at a time, but clearly if a different number of chutes were employed the amount of rotation would be different. According to the invention, as the buckets arrive at the charging device they automatically couple themselves to a chute and then bring about rotation of the hopper and chutes. The hopper 11 may be in free communication with the receiver 10 or in some circumstances it may be advantageous to arrange that during rotation of the hopper communication between it and the receiver 10 is cut off. In Figure 1 two perforated plates are illustrated at 24 and 25, whereof the former is stationary and the latter rotates with the hopper. The perforations in these plates are arranged to coincide when the hopper is stationary and to be out of register when the hopper is moving. The plates 24 and 25, therefore, constitute a valve which controls the passage of the material into the hopper.

To effect the automatic coupling of the arriving bucket to the charging device, each chute 12 and 13 has pivoted to it at its end a framework which consists of a lower portion 26 and an upper portion 27. This framework is shown in detail in Figures 3 and 4. The lower portion 26 is provided with weights 28 which tend to keep it in the position shown in full lines in the drawings. The upper portion 27 of the framework includes an end member 29 which reaches out from the chute to a position adjacent the path of the buckets. The upper surface 30 of the member 29 is curved and towards its middle has a slot 31. The bucket carrier 22 is provided with a downwardly directed projection 32 and the position of the carrier 22 and end member 29 is such that as a bucket arrives the projection 32 will ride along the curved edge 30, forcing the members 26 and 27 into the position shown in dot and dash lines in Figure 4, until it reaches the slot 31. The weights 28 will then cause the return of the framework 26 and 27 to the position shown in full lines and the bucket will thus be locked to the framework and thus to the hopper 11. The rope 17, continuing its travel, will, therefore, rotate the hopper and chutes, until the chute 13 is brought into the position shown in the drawings as being occupied by the chute 12. As it is reaching this situation, a downwardly directed projection 33 on the framework member 26 will bear against a cam-shaped rail 34 which is so shaped that at the appropriate moment it will move the framework 26 and 27 into the position shown in dot and dash lines again and thus disengage it from the bucket. The latter will then be free to continue along the ropeway system. Meanwhile, the chute 12 will have arrived at the position shown in the drawings as being occupied by the chute 13. At this place there is a rail 35, see Figure 5, having a slot 36 into which the projection 33 will enter under the influence of the weights 28. The bucket-charging device will thus be held against undesired rotation until the arrival of the next bucket. This bucket in locking itself to the framework member 29 will simultaneously release the projection 33 from the slot 36.

It is a feature of the invention to combine with the chutes, closures controlling delivery therefrom, said closures being automatically operated through cams or the like by the operation of the chutes. The means for opening and closing the closures may be of any convenient type such as a graded rail operating a vertical bar, or balance weights, or springs, or cams. In the construction shown the closure takes the form of a pivoted member comprising a flat portion 37 intermediate the ends of which the pivot 38 lies. Conveniently, this pivot 38 supports both the member 37 and the framework 26, 27 aforesaid. At one end of the flat member 37 is a turned-up portion 39 which is carried upon the member 37. The members 37 and 39 have at their edges side pieces 40 and thus a hod-like receptacle is constituted. This receptacle is intended to be large enough to receive a full charge for one of the buckets 20 and the receptacle is intended to swing, as the charge is being delivered, so as to bring the turned-up portion 39 across the bottom of the chute 12 or 13 and thus prevent the passage of further material until the closure has been swung back again. In Figure 1 the receptacle at the bottom of the chute 13 is shown full and ready for being swung into delivering position. In this same figure the receptacle at the bottom of the chute 12 is shown as having delivered its contents into the bucket 20 and having, through its portion 39, shut off the bottom of the chute 12. While the bucket-charging device is moving round with a bucket it delivers into the bucket the contents of that receptacle which is coupled to the bucket, while simultaneously the receptacle of the other chute is being moved into the position in which it is itself recharged from the chute. The receptacles are thus filled and emptied alternately, the complete cycle occurring during the complete rotation of the hopper. To effect the requisite movements of the closures, they each carry an arm 41 with a roller 42. This roller is controlled by two cams 43 and 44 and it travels along the upper surface of the former and along the under surface of the latter. The cam 43 moves the closure from the position shown at the right hand side of Figure 1 into the position shown at the left hand side of Figure 1, and the cam 44 effects the reverse operation. In Figure 1 the cam 44 is shown in dot and dash lines. The cams 43 and 44 are supported upon suitable standards 45.

To facilitate dealing with lumpy material, and to tend to prevent the closures jamming, the sides of the chutes at 46 may be left open. By suitably proportioning the parts wastage through this opening may be prevented by relying on the angle of slip of the material.

From the foregoing it will be seen that when a bucket reaches the bucket-charging device it will automatically couple itself to the latter and carry it round with it. The appropriate chute closure will be opened during that rotation and the bucket filled, and when the appropriate point is reached the bucket will automatically disengage itself from the discharging device whereupon rotation of the device ceases.

In the construction shown in Figures 1 to 5 the bucket itself actually transmits the driving effort to the charging device. This, however, is not essential as will be seen from Figures 6 to 11.

In the construction shown in Figures 6 to 9 12 and 13, a central pedestal 47 supports an annular hopper 48 having depending from it chutes 49 which are similar to the chutes 12 and 13. A feed cone 70 which is concentric with the axis of rotation of the hopper 48 is closed at its lower end and has an outlet port 71 at one side, which is situated centrally under the mouth of the feed hopper 10; the hopper 48 has a funnel-shaped mouth-piece 148, which slidably fits the outside of the feed cone 70 and has two inlet ports 149 allotted one to each chute 49, and arranged each to register with the outlet port 71 during the rotation of the hopper 48. The member 148 thus constitutes a valve for controlling the feed of the material to the chutes. Around the hopper 48 is mounted a circular member 50 constituting a sheave having a grooved edge 51 against which the rope 17 bears. The member 50 is thus continuously rotated by the rope. A shunt rail 52 situated above the sheave 50 receives the wheels 23 of the bucket. On the upper surface of the sheave 50 is a rack 53 which is utilized to rotate the hopper 48 and chutes 49 when a bucket arrives in position for filling. To effect this, a pawl 54 is provided which is carried upon a shaft 55 mounted in suitable bearings on the hopper 48. The pawl 54 has two weighted arms 56 and 57 which co-operate with each other to maintain the pawl either in or out of engagement with the teeth of the rack 53. These two positions are shown in full and dot and dash lines in Figures 8 and 9. The carrier 22 of the bucket is provided with a projecting arm 58 which as the bucket arrives engages the arm 56 and knocks the pawl into engagement with the rack 53. Since the latter is continuously rotating, rotation of the hopper is immediately commenced. When the bucket arrives at the other side of the charging device and requires the rotation of the latter to cease, a stationary abutment 59 is encountered by the arm 57 (see Figure 9). This disengages the pawl 54 from the rack 53. To ensure that the abutment 59 shall not move the pawl in such a manner as to cause the arm 56 to strike against the projection 58 on the bucket carrier before the latter has had time to leave, and thus cause relocking of the pawl to the rack, the rail 52 is elevated as shown in Figure 9.

The stationary pedestal 47 is formed with a tooth 60 and adapted to engage with this tooth is a second pawl 61 carried upon the shaft 55. This tooth 60 is so situated that the pawl 61 will engage when it is required that the rotation of the charging device shall cease. The arrangement of the parts is such that when the stationary abutment 59 disengages the pawl 54 it also moves the pawl 61 into such a position that it will enter into locking engagement with the tooth 60 when it reaches the latter. Both chutes 49 will carry the locking pawls 61 but there will only be one tooth 60. In this manner the momentum of the charging device will be prevented from carrying the latter past a position at which it should remain stationary.

In the construction shown in Figures 10 and 11 the arrangement of the parts is substantially the same as in Figures 6 to 9, but instead of a stationary shunt rail 52, the base of the hopper 48 is extended to form a rail 62 on which the wheels 23 may run. Co-operating with the rail 62 are guide rails 63, 64 as shown in Figure 11. At 65 in Figure 11 there is illustrated a suitable position for the stationary abutment (numbered 59 in Figure 9) for disengaging the pawl 54 from the rack 53. The hopper 48 may be filled by a delivery chute 66 as shown in dot and dash lines in Figure 10 and the chutes 49 may be provided with closures operating in the same manner as has already been described in conjunction with Figures 1 to 5.

The sheave 50 may be employed to drive the rope if desired, it being coupled to a suitable motor for this purpose, or as already described other means may be employed for driving the rope, and the latter itself drive the sheave 50.

The invention may be applied to all types of ropeway conveyer systems and as will be appreciated from the foregoing description may be made quite automatic in operation.

It is to be understood that the invention is not limited to the precise constructional details hereinbefore set forth.

I claim:

1. In a ropeway bucket conveyer system, the combination with an automatic bucket-charging device of automatic means for coupling it to a bucket at one point of its travel, means for causing the bucket-charging device to charge the bucket while moving circularly with it, automatic means for disengaging the bucket from the bucket-charging device at a later point in its travel and means for returning the bucket-charging device to its initial position by moving it in a single direction in the path in the form of a complete circle, to a portion only of which the path of the bucket corresponds.

2. In a ropeway bucket conveyer system, the combination with an automatic bucket-charging device of a member for coupling it to a bucket to move circularly therewith, means for pivoting said member upon the charging device, an abutment on the member adapted to lie in the path of the bucket and be engaged by the latter, means for causing the bucket-charging device to charge the bucket while moving with it, and means for returning the bucket-charging device to its initial position by moving it in a single direction in a path in the form of a complete circle, to a portion only of which the path of the bucket corresponds.

3. In a ropeway bucket conveyer system, the combination with an automatic bucket-charging device of a member adapted in one position to couple the charging device to a bucket to move circularly therewith and in another position to lock the charging device against undesired rotation, means operated by the movement of the bucket and controlling said member to move it from one to the other of said positions automatically, means for causing the bucket-charging device to charge the bucket while moving with it, and means for returning the bucket-charging device to its initial position by moving it in a single direction in a path in the form of a complete circle, to a portion only of which the path of the bucket corresponds.

4. In a ropeway bucket conveyer system, a bucket-charging device comprising in combination rotatable feed chutes, a rotary member adapted to move concentrically with the path of said chutes, means for continuously rotating said member and means operated by the buckets for coupling the chutes to the said member to rotate therewith.

5. In a ropeway bucket conveyer system, a bucket-charging device comprising in combination rotatable feed chutes, means for intermittently rotating said feed chutes, a rotary member adapted to move concentrically with the path of said chutes, means for continuously rotating said member, a pawl carried on the chutes, a rack on the continuously rotating member, an arm moving with the buckets and adapted to swing the pawl into engagement with the rack to couple the chutes to the said continuously rotating member.

6. In a ropeway bucket conveyer system, a bucket-charging device comprising in combination rotatable feed chutes, means for intermittently rotating said feed chutes, a rotary member adapted to move concentrically with the path of said chutes, means for continuously rotating said member, a pawl carried on the chutes, weighted arms controlling said pawl, a rack on the continuously rotating member, an arm moving with the buckets and adapted to swing the pawl into engagement with the rack to couple the chutes to the said continuously rotating member.

7. In a ropeway bucket conveyer system, a bucket-charging device comprising in combination rotatable feed chutes, means for intermittently rotating said feed chutes, a rotary member adapted to move concentrically with the path of said chutes, means for continuously rotating said member, a pawl carried on the chutes, a rack on the continuously rotating member, an arm moving with the buckets and adapted to swing the pawl into engagement with the rack, and a stationary abutment to disengage the pawl from the rack at a predetermined point in their travel.

8. In a ropeway bucket conveyer system, a bucket-charging device comprising in combination rotatable feed chutes, means for intermittently rotating said feed chutes, a rotary member adapted to move concentrically with the path of said chutes, means for continuously rotating said member, a pawl carried on the chutes, a rack on the continuously rotating member, an arm moving with the buckets and adapted to swing the pawl into engagement with the rack, a stationary abutment to disengage the pawl from the rack at a predetermined point in their travel, a second pawl carried on the chutes and a stationary tooth with which the said second pawl co-operates to lock the charging device against undesired rotation, said second pawl being moved into and out of operative position by the mechanism controlling the first pawl.

9. In a ropeway bucket conveyer system, the combination with an automatic bucket-charging device, of a rigid rail situated adjacent the charging device upon which the buckets travel during the charging operation, means carried by each bucket for causing the charging device to move with and charge said bucket while moving circularly and means for returning the bucket-charging device to its initial position by moving it in a single direction in a path in the form of a complete circle, to a portion only of which the path of the bucket corresponds.

10. In a ropeway bucket conveyer system, the combination with an automatic bucket-charging device, of a rigid rail situated adjacent the charging device upon which the buckets travel during the charging operation, a member for coupling the charging device to a bucket to move circularly therewith, a portion of said rail being more elevated than other portions, means operated by the movement of the bucket and by said elevated portion of the rail for controlling said member to move it into and out of operative position automatically, means for causing the bucket-charging device to charge the bucket while moving with it, and means for returning the bucket-charging device to its initial position by moving it in a single direction in a path in the form of a complete circle, to a portion only of which the path of the bucket corresponds.

11. In a ropeway bucket-conveyer system, the combination with a rotatable bucket-charging device having a delivery outlet movable along a path in the form of a complete circle, means on each bucket for intermittently rotating said device in only one direction, closure means controlling the discharge of material through said outlet, means controlled by the rotation of the bucket charging device for automatically operating said closure means to open said outlet whilst it moves along an arc of said path, a bucket movable along a path concentric with said arc, and mechanism for automatically maintaining the bucket in such positional relation to said outlet as to receive the material discharged therefrom whilst the bucket travels concentric with said arc.

12. In a ropeway bucket-conveyer system, the combination of a main receiver for material to be fed having an outlet in its lower portion, a hopper situated below the outlet and rotatable relatively to said receiver about a central axis passing through said outlet, which hopper has a plurality of downwardly-directed chutes having each a delivery outlet movable along a path in the form of a complete circle, cam actuated means for automatically controlling the said delivery outlets and arranged to open the same while they are moving along an arc of said path and to close the same while they are moving along the remainder of said path, driving means for intermittently rotating said hopper, a complete revolution, and a plurality of buckets continuously driven by said driving means and movable in turn each in a path concentric with said arc and in such positional relation each to one of the chute-delivery outlets as to receive the material delivered therefrom.

13. In a ropeway bucket-conveyer system, the combination with a loading station having an arcuate track, a moving rope, and buckets driven by the latter along said track, each bucket having a driving member, of a rotatable hopper having a delivery outlet movable along a path in the form of a complete circle concentric with said track, which hopper is arranged automatically to deliver material whilst its outlet is moving along an arc of said path equivalent to the arc of said track, and mechanism arranged to be actuated by a driving member of a bucket for automatically causing the rope to rotate said hopper and automatically hold each bucket in such positional relation to said outlet as to receive the material discharged therefrom whilst the buckets are respectively traveling along said track.

14. In a ropeway bucket-conveyer system, the combination with a loading-station having an arcuate track, a moving rope, and buckets driven by the latter along said track, each bucket having a driving member, of a rotatable hopper having a plurality of delivery outlets spaced angularly apart and movable each along a path in the form of a complete circle concentric with said track, each delivery outlet having closure means controlling the discharge of material through the same, means for operating said closure means to open each delivery outlet whilst it moves along an arc of said path in such positional relation to a bucket moving on said track as to deliver material into the bucket, and clutch means automatically controlled by the driving member of each bucket for clutching said rope to said hopper whilst each bucket travels along said track and thereby rotating the hopper.

15. In a ropeway bucket-conveyer system, the combination of a rotatable bucket-charging device having a delivery outlet movable along a path in the form of a complete circle, means for rotating said device in only one direction, closure means controlling the discharge of material through said outlet, cam-actuated means controlled by the rotation of said device for operating said closure means and arranged to open said outlet whilst it moves along an arc of said path, a bucket movable in a path concentric with said arc and in such positional relation to said outlet as to receive the material discharged therefrom, and means for automatically maintaining the bucket in said positional relation to said outlet whilst the bucket travels parallel to said arc.

16. In a ropeway bucket-conveyer system, the combination with a rotatable bucket-charging hopper having a delivery outlet movable along a path in the form of a complete circle, and closure means automatically controlling the discharge of material through said outlet during the rotation of the hopper, of means for automatically operating said closure means to open said outlet whilst it moves along an arc of said path, a bucket movable on a track concentric with said arc and in such positional relation to said outlet as to receive the material discharged therefrom, and clutching means for automatically clutching the rope to said hopper whilst a bucket travels parallel to said outlet, which clutching means comprises a rotary member driven by said rope about the axis of rotation of said hopper, a toothed rack carried by said rotary member, a pawl mounted on said hopper and arranged to engage said rack, means controlled by a bucket for moving the pawl into engagement with said rack when the bucket is at one end of the track, and means for moving the pawl out of engagement with the rack when the bucket is at the other end of said rack.

17. In a ropeway bucket-conveyer system, the combination with a rotatable hopper having a delivery outlet movable along a path in the form of a complete circle, and closure means automatically controlling the discharge of material through said outlet during the rotation of the hopper, of means for automatically operating said closure means to open said outlet whilst it moves along an arc of said path, a bucket movable in a path concentric with said arc and in such positional relation to said outlet as to receive the material discharged therefrom, and clutching means for automatically clutching the rope to said hopper whilst a bucket travels concentric with said outlet, which clutching means comprises a rotary member driven by said rope about the axis of rotation of said hopper, a toothed rack carried by said rotary member, a pawl mounted on said hopper and arranged to engage said rack, means controlled by a bucket for moving the pawl into engagement with said rack when the bucket is at one end of the track, and means for moving the pawl out of engagement with the rack when the bucket is at the other end of said track, and hopper-arresting means comprising a stop carried by the hopper and fixed means arranged to be engaged by said stop and thereby hold the bucket-charging device against rotation after the delivery outlet has travelled along said arc.

18. In a ropeway bucket-conveyer system, the combination of a rotatable hopper provided with a chute having a delivery outlet movable along a path in the form of a complete circle and arranged automatically to deliver material whilst the outlet is moving along an arc of said path, a driving rope for rotating said hopper in one direction, a plurality of buckets driven by said rope, which buckets are movable in turn each in a path concentric with said arc and each in such positional relation to said outlet as to receive the material delivered therefrom, an arresting member, and means carried by said hopper and arranged to coact with said arresting member and thereby hold the hopper against rotation after the delivery outlet has travelled along said arc, which means are arranged to be actuated by each bucket and to be thereby released from said arresting member.

19. In a ropeway bucket-conveyer system, the combination of a rotatable hopper having a plurality of downwardly-directed chutes having each a delivery outlet movable along a path in the form of a complete circle, a sheave concentric with said hopper, a driving rope engaging said sheave, buckets driven by the rope along an arcuate track concentric with said circle, clutching means operated by the buckets and arranged to clutch said sheave to said hopper and cause the buckets to move each in such positional relation to a chute-outlet as to receive material delivered therefrom, a plurality of closure members, one for each delivery outlet, controlling the discharge of material through said outlets, and means for operating said closure members to open each outlet whilst it moves along in said positional relation to a bucket.

In testimony whereof I affix my signature.

HENRY OTTO.